United States Patent
Takiguchi

(10) Patent No.: US 9,501,828 B2
(45) Date of Patent: Nov. 22, 2016

(54) IMAGE CAPTURING DEVICE, IMAGE CAPTURING DEVICE CONTROL METHOD, AND PROGRAM

(75) Inventor: Masafumi Takiguchi, Kanagawa (JP)

(73) Assignee: SONY CORPORATION, Tokyo (JP)

(*) Notice: Subject to any disclaimer, the term of this patent is extended or adjusted under 35 U.S.C. 154(b) by 610 days.

(21) Appl. No.: 13/366,773

(22) Filed: Feb. 6, 2012

(65) Prior Publication Data

US 2012/0224032 A1     Sep. 6, 2012

(30) Foreign Application Priority Data

Feb. 9, 2011   (JP) .................. 2011-026242

(51) Int. Cl.
| | |
|---|---|
| H04N 13/02 | (2006.01) |
| G06K 9/32 | (2006.01) |
| G06K 9/36 | (2006.01) |
| G02B 7/38 | (2006.01) |
| G06T 7/00 | (2006.01) |
| H04N 13/00 | (2006.01) |

(52) U.S. Cl.
CPC ......... *G06T 7/0028* (2013.01); *H04N 13/0025* (2013.01); *H04N 13/0246* (2013.01); *H04N 13/0296* (2013.01); *G06T 2207/10012* (2013.01)

(58) Field of Classification Search
CPC ............... H04N 4/225; H04N 13/0025; H04N 13/02; H04N 5/262; G06K 9/32; G06K 9/36; G06K 9/00; G03B 2205/0046; G02B 7/38
USPC ........ 347/47; 348/42, 46, 231.3, 47, 240.99, 348/240.03, E13.074; 382/300, 154, 284, 382/276
See application file for complete search history.

(56) References Cited

U.S. PATENT DOCUMENTS

| | | | |
|---|---|---|---|
| 6,516,099 B1* | 2/2003 | Davison | G06T 7/0028 345/419 |
| 6,549,650 B1* | 4/2003 | Ishikawa | G02B 27/2264 345/419 |

(Continued)

FOREIGN PATENT DOCUMENTS

| | | |
|---|---|---|
| JP | 2009-258868 | 11/2009 |
| JP | 2010-128820 | 6/2010 |

OTHER PUBLICATIONS

Office Action issued on Dec. 1, 2014 in the corresponding Chinese Patent Application No. 201210022640.3 (with English Translation).

*Primary Examiner* — Jorge L Ortiz Criado
*Assistant Examiner* — Albert Kir
(74) *Attorney, Agent, or Firm* — Oblon, McClelland, Maier & Neustadt, L.L.P.

(57) ABSTRACT

An image capturing device includes: a plurality of image capturing units that capture images from different viewpoints; an image analyzing unit that detects characteristic points by image analysis of the images captured by the plurality of image capturing units; a control unit that calculates image conversion parameters for correction of inputting characteristic point information generated by the image analyzing unit to correct deviation in the up and down direction of the plurality of images captured by the plurality of image capturing units; and an image conversion unit that performs a conversion process of the captured images of the plurality of image capturing units by applying the image conversion parameters calculated by the control unit.

20 Claims, 8 Drawing Sheets

(56) References Cited

U.S. PATENT DOCUMENTS

| | | |
|---|---|---|
| 6,552,742 B1* | 4/2003 | Seta .................................. 348/42 |
| 6,823,080 B2* | 11/2004 | Iijima et al. ................... 382/154 |
| 7,596,286 B2* | 9/2009 | Nose et al. ..................... 382/300 |
| 7,697,749 B2* | 4/2010 | Ogawa .......................... 382/154 |
| 2005/0024504 A1* | 2/2005 | Hoshi ......................... 348/231.3 |
| 2010/0157107 A1* | 6/2010 | Iijima et al. ............. 348/240.99 |
| 2010/0277620 A1 | 11/2010 | Iijima et al. |

\* cited by examiner

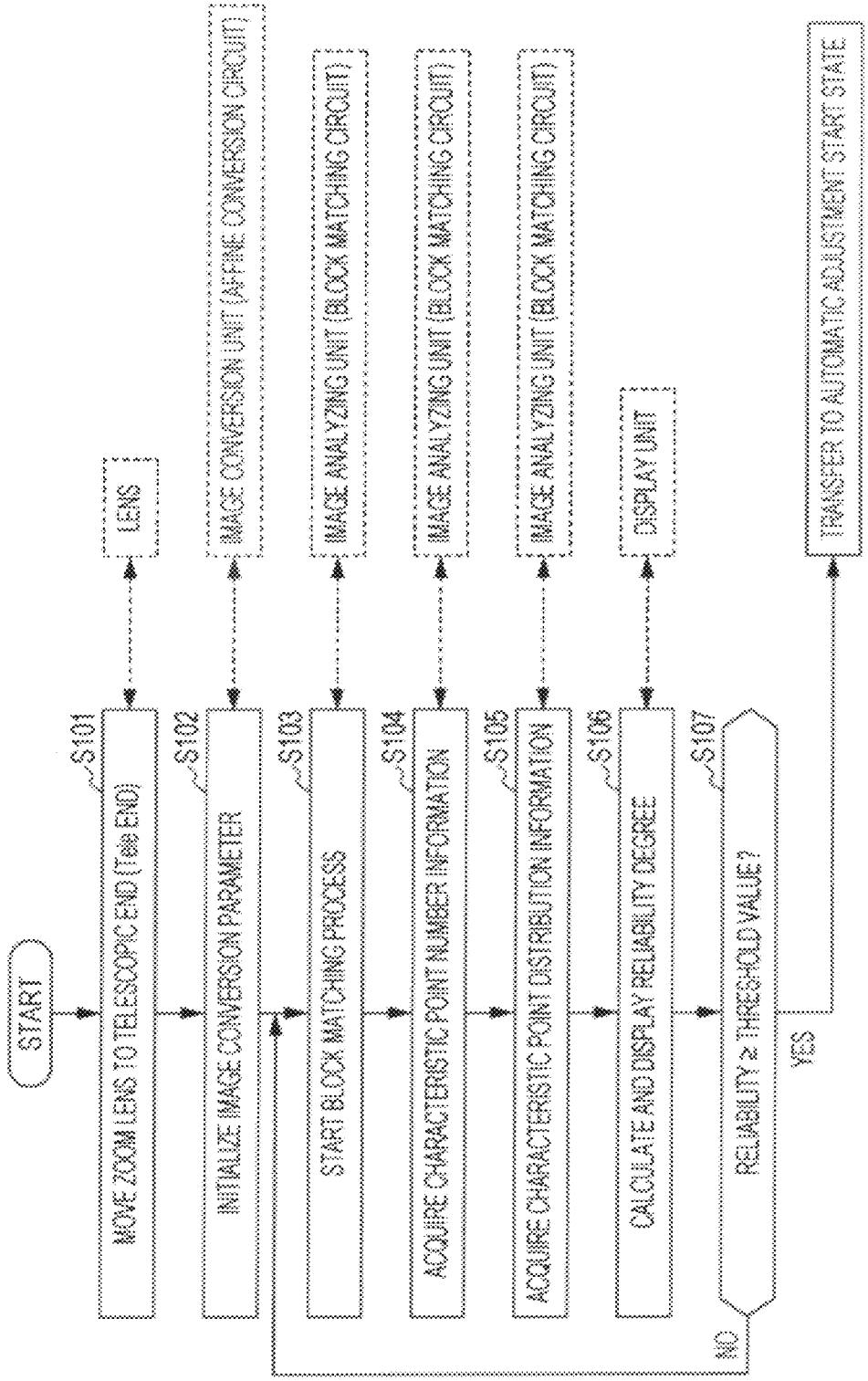

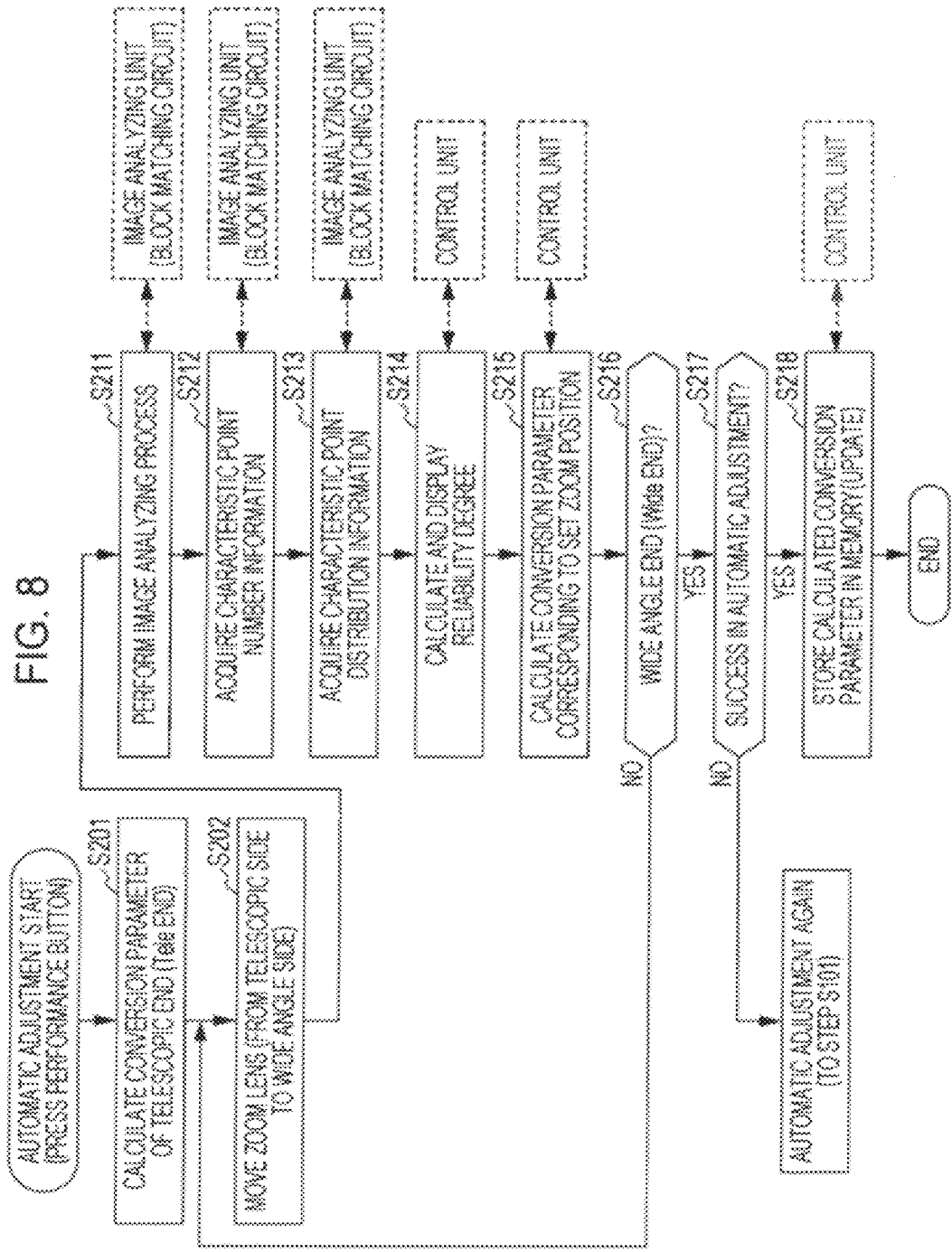

IMAGE CAPTURING DEVICE, IMAGE CAPTURING DEVICE CONTROL METHOD, AND PROGRAM

BACKGROUND

The present disclosure relates to an image capturing device, an image capturing device control method, and a program, and more particularly, to an image capturing device, an image capturing device control method, and a program, in which a process of detecting and correcting deviation between a left eye image and a right eye image in an image capturing device (camera) capturing, for example, a 3-dimensional image (3D image), particularly, up and down image deviation is performed.

Recently, a display device such as a television and a PC capable of displaying a 3-dimensional image (3D image) and a video camera and a still image camera capable of recording a 3-dimensional image (3D image) have been developed and used. To display the 3D image, it is necessary to capture two images from different viewpoints. That is, two images are a left eye image from a left function point and a right eye image from a right function point.

When two images captured from different viewpoints are displayed, a control is performed such that the left eye image is viewed only by a left eye of a viewer and the right eye image is viewed only by a right eye of the viewer, and the viewer can obtain a 3-dimensional effect. As a display processing method of the 3D image, there are various methods.

For example, there is a method in which the left eye image and the right eye image are alternately displayed on the display device, the viewer puts on shutter type glasses, shutter conversion is performed for each of a display period of the left eye image and a display period of the right eye image, and each image is viewed only by one eye.

For example, there are various methods such as a method in which a left eye image and a right eye image are alternately displayed in a slit shape on a display device having a display face in which a lenticular lens is subjected to a special process, the left eye image is viewed through a lens of the display face only by a left eye of a viewer, the right eye image is viewed through a lens of the display face only by a right eye of the view, the 3-dimensional effect can be obtained by eyesight of the naked eyes.

To capture the 3D image, two image capturing units capturing the left eye image and the right eye image are separated at a proper distance and are horizontally disposed (left and right). Image deviation in the horizontal direction occurring between the left and right images is called parallax.

The parallax is recognized as depth information, and thus the viewer can 3-dimensiontally view the image.

The image deviation according to the positions of two image capturing units capturing the left eye image and the right eye image may occur in a direction other than the parallax direction in the horizontal direction.

For example, image deviation in the up and down direction as geometric deviation caused by various camera configurations, such as deviation in the up and down direction of axial disposition of two image capturing units, angular deviation in the up and down direction of the optical axes of two image capturing units, or positional deviation of an image capturing element from the optical axis.

The image deviation in the up and down direction between the left eye image and the right eye image in the 3D image is not only a case of interference in the 3-dimensional view but also a cause of fatigue of eyes of the viewer, and thus it is necessary to remove the deviation.

To correct the deviation in the up and down direction between the images, there is a method in which image comparison is performed by block matching or the like on two images captured by two image capturing units, conversion parameters for correcting the image deviation, for example, affine parameters are calculated, and conversion of the captured image is performed. Proper conversion parameters are input by an affine conversion circuit, conversion (affine conversion) of the captured image is performed, and thus it is possible to correct the geometric deviation between two pictures.

For example, Japanese Unexamined Patent Application Publication No. 2009-258868 (Sony Corporation) discloses a method of calculating affine parameters by block matching. In Japanese Unexamined Patent Application Publication No. 2009-258868, pictures with time difference are compared by one camera, but it may be applied to comparison of simultaneous pictures of two cameras.

Japanese Unexamined Patent Application Publication No. 2010-128820 (Fujifilm Corporation) discloses a method of estimating geometric conversion parameter when a plurality of cameras are used.

However, for example, the image comparison based on the block matching described in Japanese Unexamined Patent Application Publication No. 2010-128820 is performed to detect the image deviation, it is necessary to detect a sufficient number of characteristic points (correspondence points) in the image that is a comparison target.

For example, when most of a captured image is "void", most of image areas of the left eye image and the right eye image captured by two image capturing units become images with uniform brightness with no change in brightness.

When the images with such uniform brightness are compared with each other, it is difficult to uniquely determine a block of the comparison target. Accordingly, it is difficult to detect effective characteristic points (correspondence points). As a result, detection precision in geometric deviation deteriorates. When correction is performed with low detection precision, it is difficult to sufficiently remove the geometric deviation, and there is a risk that the deviation is increased.

SUMMARY

It is desired to provide an image capturing device, an image capturing device control method, and a program, in which image deviation in the up and down direction and the like occurring in captured images from a plurality of different viewpoints are reliably detected, and high precision conversion parameters for image conversion to correct the deviation of the up and down direction are calculated to perform correction.

According to a first embodiment of the present disclosure, there is provided an image capturing device including: a plurality of image capturing units that capture images from different viewpoints; an image analyzing unit that detects characteristic points by image analysis of the images captured by the plurality of image capturing units; a control unit that calculates image conversion parameters for correction of inputting characteristic point information generated by the image analyzing unit to correct deviation in the up and down direction of the plurality of images captured by the plurality of image capturing units; and an image conversion unit that performs a conversion process of the captured images of the plurality of image capturing units by applying the image conversion parameters calculated by the control unit, wherein the control unit performs a process of inputting the characteristic point information generated by the image analyzing unit, in which a position where the zoom lens of the image capturing unit is set to a telescopic end is an initial position, on the basis of the captured image at the initial position, calculating reliability degrees of the image conversion parameters, and displaying the reliability degrees as an indicator on a display unit.

In the image capturing device according to the embodiment of the present disclosure, when it is confirmed that the reliability degree calculated at the initial position where the zoom lens is set to the telescopic end is equal to or more than a predetermined threshold value, the control unit may sequentially move the zoom lens from a telescopic side to a wide angle side, and may perform a calibration process of calculating the image conversion parameters and the reliability degrees using the characteristic point information input from the image analyzing unit at a plurality of zoom positions.

In the image capturing device according to the embodiment of the present disclosure, when it is determined that the reliability degree calculated at the initial position where the zoom lens is set to the telescopic end is less than the predetermined threshold value, the control unit may output a message of request to change the captured image.

In the image capturing device according to the embodiment of the present disclosure, the plurality of image capturing units may capture a left eye image and a right eye image applied to 3-dimensional image display, and the control unit may calculate image conversion parameters for correction to correct the deviation in the up and down direction of the left eye image and the right eye image applied to 3-dimensional image display.

In the image capturing device according to the embodiment of the present disclosure, the image analyzing unit may perform a block matching process on the captured image of the plurality of image capturing units to detect characteristic points based on the block matching process.

In the image capturing device according to the embodiment of the present disclosure, the image analyzing unit may generate characteristic point information including the number of characteristic points satisfying a predetermined condition and distribution of the characteristic points and may output the characteristic point information to the control unit in the characteristic point detecting process based on the image analysis of the captured images of the plurality of image capturing units, and the control unit may calculate the reliability degrees by applying the characteristic point information including the number of characteristic points satisfying the predetermined condition and the distribution of the characteristic points.

In the image capturing device according to the embodiment of the present disclosure, the image conversion unit may be an image conversion unit performing affine conversion, and the control unit may calculate image conversion parameters applied to the affine conversion.

In the image capturing device according to the embodiment of the present disclosure, the control unit may sequentially move the zoom lens from the telescopic side to the wide angle side, and may calculate the image conversion parameters and the reliability degrees using the characteristic point information input from the image analyzing unit at a plurality of zoom positions, and data in which positions of the zoom lens, the image conversion parameters, and the reliability degrees are associated may be stored in a memory.

In the image capturing device according to the embodiment of the present disclosure, the control unit may sequentially move the zoom lens from the telescopic side to the wide angle side, and may calculate the image conversion parameters and the reliability degrees using the characteristic point information input from the image analyzing unit at the plurality of zoom positions, it may be determined whether or not a predetermined process success condition is satisfied on the basis of values of the plurality of reliability degrees calculated at the plurality of zoom positions, when it is determined as success, the calculated image conversion parameters may be stored as effective parameters in a memory, and when it is determined as failure, a message representing failure of the process may be output.

According to a second embodiment of the present disclosure, there is provided an image capturing device control method performed on an image capturing device, the method including: detecting characteristic points by image analysis of captured images of a plurality of image capturing units that capture images from different viewpoints, by an image analyzing unit; and inputting characteristic point information generated in the analyzing of the images to calculate image conversion parameters for correction to correct deviation in the up and down direction of the plurality of images captured by the plurality of image capturing units, by a control unit, wherein the control unit performs a process of inputting the characteristic point information generated by the image analyzing unit, in which a position where the zoom lens of the image capturing unit is set to a telescopic end is an initial position in the calculating of the parameters, on the basis of the captured image at the initial position, calculating reliability degrees of the image conversion parameters, and displaying the reliability degrees as an indicator on a display unit.

According to a third embodiment of the present disclosure, there is provided a program for causing an image capturing device to execute an image capturing device control process of: detecting characteristic points by image analysis of captured images of a plurality of image capturing units that capture images from different viewpoints, by an image analyzing unit; and inputting characteristic point information generated in the analyzing of the images to calculate image conversion parameters for correction to correct deviation in the up and down direction of the plurality of images captured by the plurality of image capturing units, by a control unit, wherein the control unit performs a process of inputting the characteristic point information generated by the image analyzing unit, in which a position where the zoom lens of the image capturing unit is set to a telescopic end is an initial position in the calculating of the parameters, on the basis of the captured image at the initial position, calculating reliability degrees of the image conversion parameters, and displaying the reliability degrees as an indicator on a display unit.

The program according to the embodiment of the present disclosure is a program provided to an information processing device capable of performing various program codes or a computer system by, for example, a storage medium. A program executing unit on an information processing device or the computer system executes such a program, thereby realizing a process corresponding to the program.

The other objects, characteristics, and advantages of the present disclosure will be clarified in detailed description based on the examples and the accompanying drawings of the present disclosure. In the specification, a system is a logical group configuration of a plurality of devices, and is not limited to that the devices of the configuration are provided in the same case.

According to the embodiment of the present disclosure, for example, the images from different viewpoints such as the left eye image and the right eye image as 3-dimensional images are captured by the plurality of image capturing units, and the image analysis such as block matching for the captured images is performed to detect the characteristic points in the image analyzing unit. The control unit inputs the characteristic point information generated by the image analyzing unit, and calculates the image conversion parameters for correction to correct the deviation in the up and down direction of the plurality of images captured by the plurality of image capturing units. In time of the process of calculating the conversion parameters, the control unit performs the process of inputting the characteristic point information generated by the image analyzing unit, in which the position where the zoom lens of the image capturing unit is set to the telescopic end is the initial position, on the basis of the captured image at the initial position, calculating the reliability degrees of the image conversion parameters, and displaying the reliability degrees as the indicator on the display unit. When the reliability degree at the telescopic end is equal to or more than the predetermined threshold value, the control unit starts calibration of calculating the conversion parameters at a plurality of points while sequentially moving the zoom lens to the wide angle side.

With such a configuration, probability of reliably detecting the characteristic points necessary for the calculation of the conversion parameters with a high reliability degree gets higher from the telescopic end to the wide angle end, and it is possible to efficiently realize the reliable conversion parameter calculation.

BRIEF DESCRIPTION OF THE DRAWINGS

FIG. 7 is a diagram illustrating a flowchart of a start determining process of calibration performed by an image capturing device.

FIG. 8 is a diagram illustrating a flowchart of a calibration process performed by the image capturing device.

DETAILED DESCRIPTION OF EMBODIMENTS

Hereinafter, an image capturing device, an image capturing control method, and a program according to embodiments of the present disclosure will be described in detail with reference to the drawings. The description is performed along the following items.

1. Configuration and Process Example of Image Capturing Device
2. Sequence of Calibration Process
3. Process of Detecting Characteristic Point and Process of Calculating Reliability Degree based on Characteristic Point Information
4. Process Sequence in Image Capturing Device
4.1. Process of Determining Calibration Start Condition
4.2. Process of Calculating Conversion Parameter corresponding to Zoom Position 1. Configuration and Process Example of Image Capturing Device First, a configuration and a process example of an image capturing device will be described with reference to FIG. 1.

The image capturing device is a camera which captures images from different viewpoints, that is, a left eye image (L image) and a right eye image (R image). An example of a camera capturing a picture as a moving image will be described.

Figure 1:
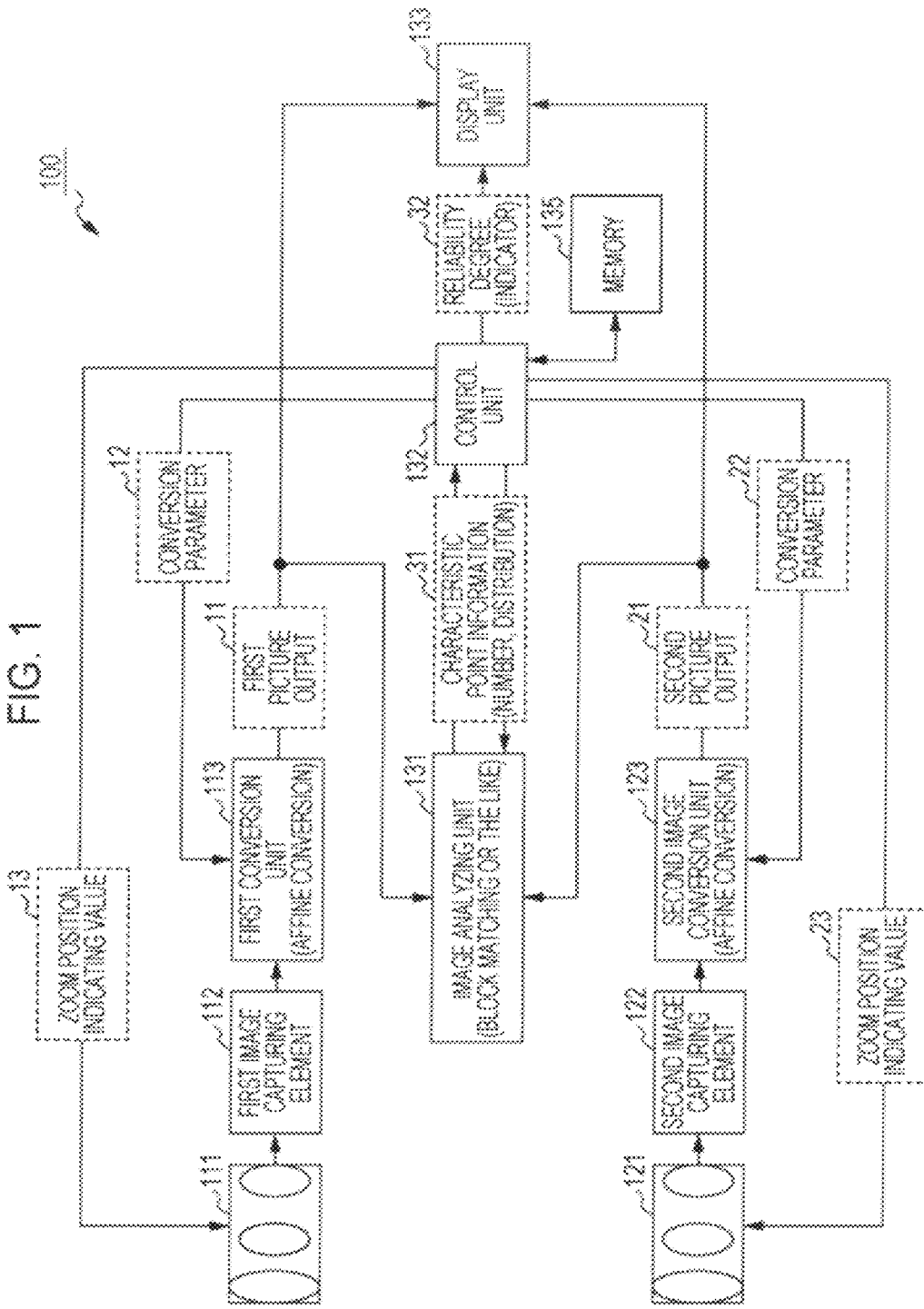
FIG. 1 is a diagram illustrating an example of a configuration of an image capturing device.

The image capturing device 100 shown in FIG. 1 has two types of image capturing configurations for capturing images from different viewpoints. Images from two different viewpoints, that is, the left eye image (L image) and the right eye image (R image) applied to 3-dimensional (3D) image display are acquired through a first lens 111 and a second lens 121 set as a plurality of image capturing units at separated positions.

Photography subject light input through the first lens 111 is input to a first image capturing element 112. Meanwhile, photography subject light input through the second lens 121 is input to a second image capturing element 122. The first image capturing element 112 and the second image capturing element 122 are, for example, photoelectric conversion elements such as CMOS and CCD, and generate an electrical signal corresponding to incident light for each pixel, and output the signal as an image signal.

The image signal output by the first image capturing element 112 is input to a first image conversion unit 113.

The image signal output by the second image capturing element 122 is input to a second image conversion unit 123.

The first image conversion unit 113 and the second image conversion unit 123 perform, for example, an image conversion process based on affine conversion.

The affine conversion is an image conversion process of performing various image deformation processes such as parallel movement, rotation, enlargement and reduction of an image. Predetermined conversion parameters are set, the affine conversion is performed, and thus it is possible to perform various kinds of image conversion.

The image conversion performed by the first image conversion unit 113 and the second image conversion unit 123 is an image conversion process to correct deviation in the up and down direction in the images from two different viewpoints captured through the first lens 111 and the second lens 121.

As described above in the related art, the image deviation in the horizontal direction occurring between the left and right images is the parallax, and the left and right deviation is deviation necessary to recognize a depth, that is, to recognize a 3-dimensional effect. However, the deviation in the up and down direction is not only interference in the 3-dimensional view but also a cause of fatigue of eyes of the viewer, and thus it is necessary to remove the deviation.

The deviation occurs on the basis of various causes such as deviation in the up and down direction of optical axis disposition of two image capturing units, angular deviation in the up and down direction of the optical axes of two image capturing units, or positional deviation of the image capturing elements with respect to the optical axis.

In the first image conversion unit 113 and the second image conversion unit 123 performs an image conversion process of correcting the image deviation in the up and down direction. Conversion parameters 12 and 22 applied to the affine conversion process performed as the image conversion process are provided from the control unit 132 as shown in the figure.

The conversion parameters are calculated in advance by a previous adjustment process before capturing an image which the user wants to capture, that is, for camera calibration, and are stored in the memory 135.

The values of the conversion parameters to correct the deviation in the up and down direction of two images (L image and R image) are values different according to the position of the zoom lens (zoom position). Accordingly, when the calibration process is performed, the conversion parameters corresponding to the plurality of zoom positions are calculated, and the conversion parameters corresponding to the zoom positions are stored in the memory 135.

After the calibration process including the process of calculating the conversion parameters corresponding to the plurality of zoom positions, the image is actually captured by the user.

In time of the image capturing, the control unit 132 acquires the conversion parameters corresponding to the zoom positions at the time of image capturing from the memory 135, provides the conversion parameters to the first image conversion unit 113 and the second image conversion unit 123, and performs the image conversion. The LR image is output as a 3D image with high quality in which the deviation in the up and down direction is corrected by the image conversion.

The information applied to the calculation process of the conversion parameters 12 and 23 in the control unit 132 is characteristic point information 31 input from the image analyzing unit 131.

The image analyzing unit 131 detects characteristic points (correspondence points) of two images (L image and R image) captured through the first lens 111 and the second lens 121, for example, by a block matching process.

The image analyzing unit 131 performs correlation determination for each predetermined block from two images (L image and R image), and performs the block matching process of determining that a block with high correlation is a correspondence characteristic point, that is, the same photography subject area.

The control unit 132 determines the deviation between two images (L images and R images) from the characteristic points (correspondence points), and calculates parameters (conversion parameters) applied to the affine conversion process for correcting the deviation between two images (L image and R image).

However, to calculate accurate image conversion parameters for correcting the deviation of two images (L image and R image) in the up and down direction, it is necessary to detect a sufficient number of characteristic points (correspondence points) with high precision from two images (L image and R image).

When the number of characteristic points (correspondence points) detected from two images (L image and R image) is drastically small or when there is declination in distribution in the detected characteristic points, it is difficult to accurately calculate the parameters for correcting the deviation in the up and down direction.

The conversion parameters calculated in such a situation are conversion parameters with a low reliability degree. When the image conversion is performed by applying such conversion parameters with the low reliability degree, so far from correcting the deviation, an erroneous image deformation process may be performed.

The control unit 132 calculates a reliability degree of calculable conversion parameters on the basis of the characteristic point information (distribution of numbers) acquired from the image analyzing unit 131. Only when the reliability degree is a reliability degree equal to or higher than a predetermined threshold value, the conversion parameters are stored as effective parameters in the memory 135, and a process used in the actual image conversion is performed.

The control unit 132 displays the calculated reliability degree information as an indicator on the display unit 133. By the indicator display process, it is possible to notify an image capturer of whether or not an image having the number of characteristic points satisfying a predetermined condition, in which the accurate conversion parameters with a high reliability degree are calculable is captured, and the distribution.

For example, when the value of the reliability degree on the indicator displayed on the display unit 133 is low, the capturer may determines that the current image is not proper for parameter calculation, and may change camera setting to capture a photography subject proper for parameter calculation by changing an angle of the camera or the like.

As described above, the image analyzing unit 131 generates the characteristic point information 31 including the number of characteristic points (correspondence points) satisfying a predetermined condition and the distribution information by the block matching process of two images (L image and R image), and outputs the characteristic point information 31 to the control unit 132. A specific example of the characteristic point information 31 including the number of characteristic points satisfying the predetermined condition and the distribution information will be described later.

In the image capturing device 100 of the embodiment, in a previous adjustment process (camera calibration process) of performing the calculation process of the conversion parameters corresponding to the zoom positions, first, the zoom lens set by the first lens 111 and the second lens 121 is set to the telescopic end (tele end).

That is, the telescopic end (tele end) is set to the initial position. The initial position is a calibration start position, and the images captured through the first lens 111 and the second lens 121 in which the initial position is the calibration start position are input as a first picture output 11 and a second picture output 21 shown in FIG. 1 to the image analyzing unit 131.

First, the image analyzing unit 131 generates the characteristic point information by the block matching process on the basis of two images (L image and R image) captured at the telescopic end (tele end) that is the initial position.

The characteristic point information 31 detected on the basis of the images at the telescopic end (tele end) by the image analyzing unit 131 is provided to the control unit 132.

The control unit 132 calculates reliability degrees of the conversion parameters on the basis of the characteristic point information. When the reliability degree at the initial position that is the telescopic end (tele end), the previous adjustment process (camera calibration process) is started.

In the previous adjustment process (camera calibration process), the conversion parameters corresponding to the zoom positions (set positions of the zoom lens) are calculated while moving the zoom lens little by little from the telescopic end (tele end) to the wide angle end (wide end).

The control unit 132 outputs zoom position indicating values 13 and 23 shown in FIG. 1, the zoom lens set by the first lens 111 and the second lens 121 is moved little by little from the telescopic end (tele end) to the wide angle end (wide end).

The image analyzing unit 131 performs the block matching process on the images captured through the lenses of the first lens 111 and the second lens 121, generates the characteristic point information, and inputs the characteristic point information to the control unit 132.

The control unit 132 calculates the conversion parameters at the zoom positions and calculates the reliability degree information.

The control unit 132 stores the conversion parameters corresponding to the zoom positions calculated by the previous adjustment process (camera calibration process), in the memory 135. However, when the reliability degree is low, the calibration is retried.

When the conversion parameters with the high reliability degrees at the zoom positions are successfully calculated, the values thereof are stored in the memory 135.

Thereafter, when the user captures an actual image, the control unit 132 acquires the conversion parameters corresponding to the zoom positions from the memory 135, and provides the conversion parameters to the first image conversion unit 113 and the second image conversion unit 123.

By such a process, the image conversion process to which the parameters with the high reliability degrees corresponding to the zoom positions are applied is performed, thereby generating an image in which the deviation between two images (L image and R image) in the up and down direction is corrected.

The converted images generated by the first image conversion unit 113 and the second image conversion unit 123 are output and displayed as the first picture output 11 and the second picture output 21 to and on the display unit 132 as shown in FIG. 1.

As described above, while the calibration is performed, the output images (first picture output 11 and second picture output 21) are also input to the image analyzing unit 131, and the characteristic point information is generated by the block matching process.

2. Sequence of Calibration Process

Next, a sequence of the calibration process will be described with reference to FIG. 2.

As described above, in the image capturing device of the embodiment, the image conversion parameters for correcting the image deviation in the up and down direction are calculated on the basis of two images (L image and R image) captured through two image capturing systems.

In time of the process, the plurality of conversion parameters corresponding to the plurality of zoom positions (set positions of zoom lens) are calculated while moving the zoom lens little by little from the telescopic end (tele end) to the wide angle end (wide end).

A process of calculating the reliability degrees of the conversion parameters based on the characteristic point information and displaying the reliability degrees as indicators on the display unit 133 is performed.

Figure 2:
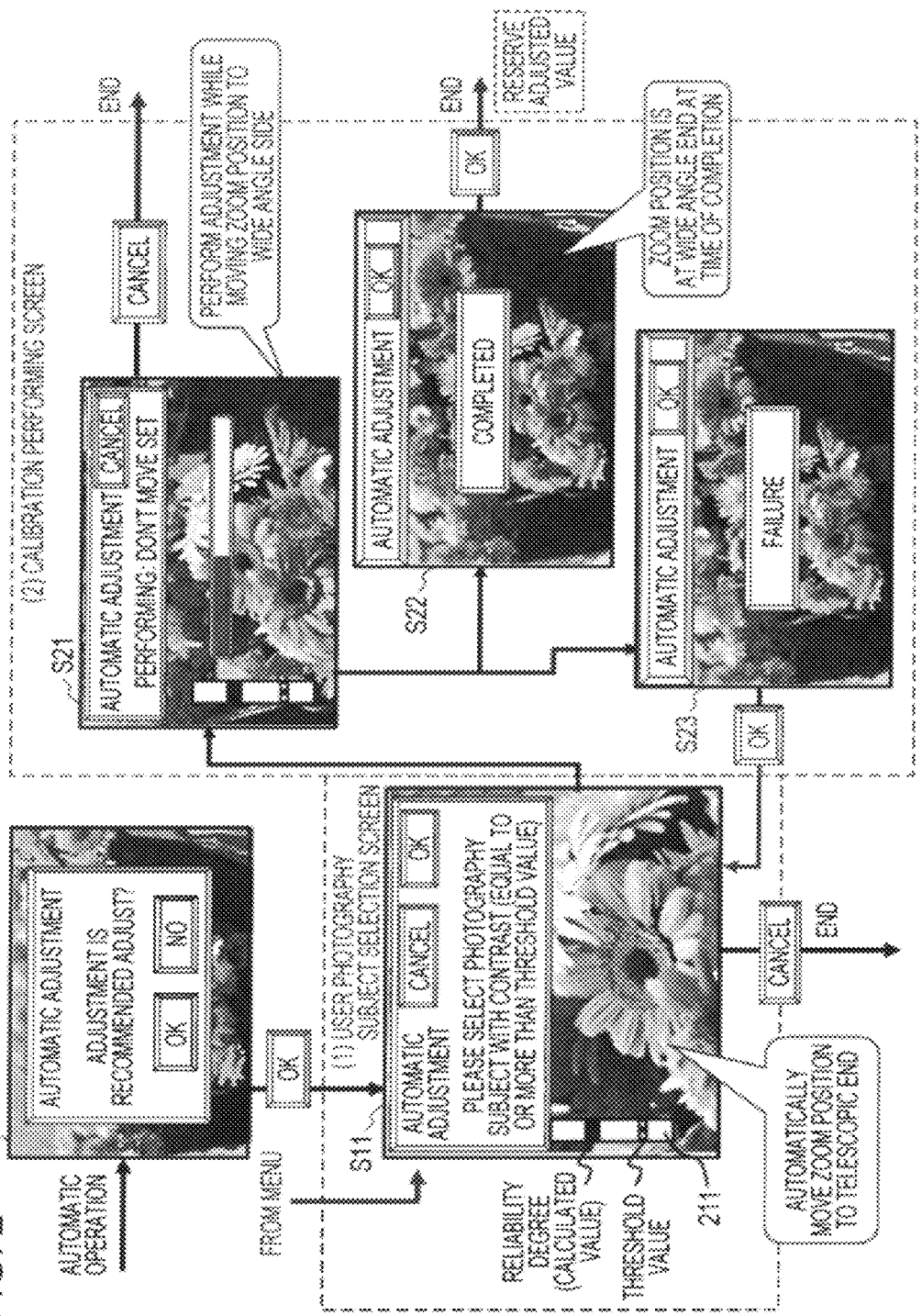
FIG. 2 is a diagram illustrating transition of a display screen corresponding to a calculation sequence of conversion parameter.

FIG. 2 is a diagram illustrating the sequence of the calibration process according to a display example of the display unit 133.

The displayed image of the left upper step (S01) is an example of an automatically operating screen, for example, at the time point when a switch of the camera is turned on.

Currently, a description screen about automatic adjustment is displayed on the image (through-image) captured through the lens. The automatic adjustment means the calculation of the conversion parameters corresponding to the zoom positions and the storage process (update process).

A fixed position, an angle of the lens in the camera, and the like are delicately changed according to, for example, use circumstances (temperature, humidity, vibration, impact, posture difference, aging change, and the like). Accordingly, the amount of deviation in the up and down direction occurring between two images (L image and R image) captured through the image capturing system. For example, it may be changed by change of season.

The parameters calculated in time of the previously performed calibration are stored in the memory 135, but it is preferable to calculate the optimal parameters in the image capturing circumstances, to update the parameters stored in the memory, and to use the updated parameters as conversion parameters of a newly captured image, at the start time point of the new capturing.

Accordingly, at the time of operating the camera, as shown in the step (S01) of FIG. 2, a guide screen of recommending performance of automatic adjustment (=calibration) as the calculation process of the new conversion parameters is provided to the user.

On the screen, when [No] of the automatic adjustment is selected, the process transfers to a normal capturing mode.

When [Ok] of the automatic adjustment is selected, the process transfers to the screen of the step (S11) of "(1) user photography subject selection screen".

The screen shown in FIG. 2 is an example of the screen displayed on the display unit 133 shown in FIG. 1. The display unit 133 also serves as a touch panel type input unit (user IF), and the user selects [Ok] or [Cancel] of touch of the screen. The input may be performed through the other input unit provided on the camera.

The screen of the step (s11) shown in FIG. 2 is the "(1) user photography subject selection screen".

The screen which is currently captured by the camera is displayed on the display unit. When the control unit 132 detects that the user select [Ok] of the automatic adjustment, the control unit 132 moves the position of the zoom lens of the first lens 111 and the second lens 121 to the telescopic end (tele end). The calibration is started in which the telescopic end (tele end) is the initial position.

First, two images (L and R images) captured at the telescopic end (tele end) are input to the image analyzing unit 131. The image analyzing unit 131 performs the block matching process based on the input images, generates the characteristic point information 31 including the number of characteristic points satisfying the predetermined condition and the characteristic point distribution, and outputs the characteristic point information the control unit 132.

The control unit 132 calculates reliability degrees of calculable conversion parameters on the basis of the characteristic point information 31, that is, the characteristic points. The calculated reliability degree information 32 is output to the display unit 133, and is displayed as the indicator 211. It is the indicator 211 shown in the image of the step (S11) shown in FIG. 2.

The reliability degree 211 calculated by the control unit 132, and a preset threshold value are displayed in the indicator 211.

When the reliability degree is less than the threshold value, the control unit 132 does not start the calibration process. When the control unit 132 determines that the reliability degree calculated at the initial position where the zoom lens is set to the telescopic end is lower than the predetermined threshold value, the control unit 132 outputs a message of request to change the captured image to the display unit 133.

On the screen of the step (S11) shown in FIG. 2, when the reliability degree of the indicator is set higher than the threshold value and [Ok] is operated by the user, the process transfers to "(2) Calibration Performing Screen". When [Cancel] is selected, the process transfers to a normal capturing mode.

On the screen of the step (S11) shown in FIG. 2, when the reliability degree of the indicator is set equal to or higher than the threshold value, when [Ok] is operated by the user, and the process transfers to "(2) Calibration Performing Screen", the calibration process is performed.

As described above, the control unit 132 calculates the conversion parameters corresponding to the zoom positions (set positions of zoom lens) while moving the zoom lens little by little from the telescopic end (tele end) to the wide angle end (wide end).

The example of the screen during the calculation of the conversion parameters is the screen of the step (S21) shown in FIG. 2.

The indicator in the horizontal direction in the screen shown in the step (S21) represents a performance state (x % completed) of the calibration process.

The control unit 132 also calculates the reliability degrees of the calculated conversion parameters at the time of calculating the conversion parameters corresponding to the zoom positions. That is, a process of acquiring data such as (a) zoom positions, (b) conversion parameters, and (c) reliability degrees as correspondence data is performed.

The conversion parameters and the reliability degrees are calculated for the predetermined zoom position (set position of zoom lens) while moving the zoom lens little by little from the telescopic end (tele end) to the wide angle end (wide end). An image applied to the parameter calculation is sequentially displayed on the display unit 133. That is, the image according to the movement from the telescopic lens (tele end) to the wide angle end (wide end) is displayed.

When the reliability degree is equal to or higher than the threshold value for the measured points of, for example, 70% or more of the measured points from the telescopic end (tele end) to the wide angle end (wide end), it is determined that it succeed in the calibration, and the process is completed. An example of the screen at this time is the screen of the step (S22) shown in FIG. 2. The screen displayed on the screen at the time of process completion is the screen of the wide angle end (wide end).

Meanwhile, when it is determined that the reliability degree is not equal to or higher than the threshold value for the measured points of, for example, 70% or more of the measured points from the telescopic end (tele end) to the wide angle end (wide end), it is determined that it fails in the calibration, and a process of notifying the user of "failure of calibration" as shown in the step (S23) shown in FIG. 2.

In the example, the value of 70% is represented as the threshold value of the determination of success, but the example is an example, and the other threshold value or determination standard may be used.

Even in the case of the success in the calibration process, the calculated conversion parameters may include a parameter with a low reliability degree.

In the case of including the parameter with the low reliability degree, it is preferable that the parameter with the low reliability degree be not applied in the actual image capturing process after the completion of the calibration process. In such a case, the control unit 132 calculates the conversion parameters of the process target using the parameters with the high reliability degree at the zoom positions before and after it. The conversion process is performed by the parameters calculated by the interpolation process.

3. Process of Detecting Characteristic Points and Process of Calculating Reliability Degree Based on Characteristic Point Information Next, a process of detecting characteristic points and a process of calculating a reliability degree based on characteristic point information.

In the image capturing device of the present disclosure, as described above, when the process of calculating the conversion parameters for correcting the deviation in the up and down direction according to the zoom position is performed, first, the lens is set to the telescopic end (tele end), is sequentially moved thereafter to the wide angle end (wide end), and the conversion parameters are calculated at the plurality of zoom positions.

As described above, the reason of sequentially moving the zoom position thereafter and calculating the conversion parameters in which the telescopic end (tele end) is the initial position will be described.

As described above, in the calculation of the conversion parameters, it is necessary to detect the characteristic points as correspondence blocks between two images.

Mostly, a large number of characteristic points (correspondence points) can be detected in the image captured at the wide and end (wide end) than in the image captured at the telescopic end (tele end).

A specific example will be described with reference to FIG. 3A to FIG. 3C.

Figure 3:
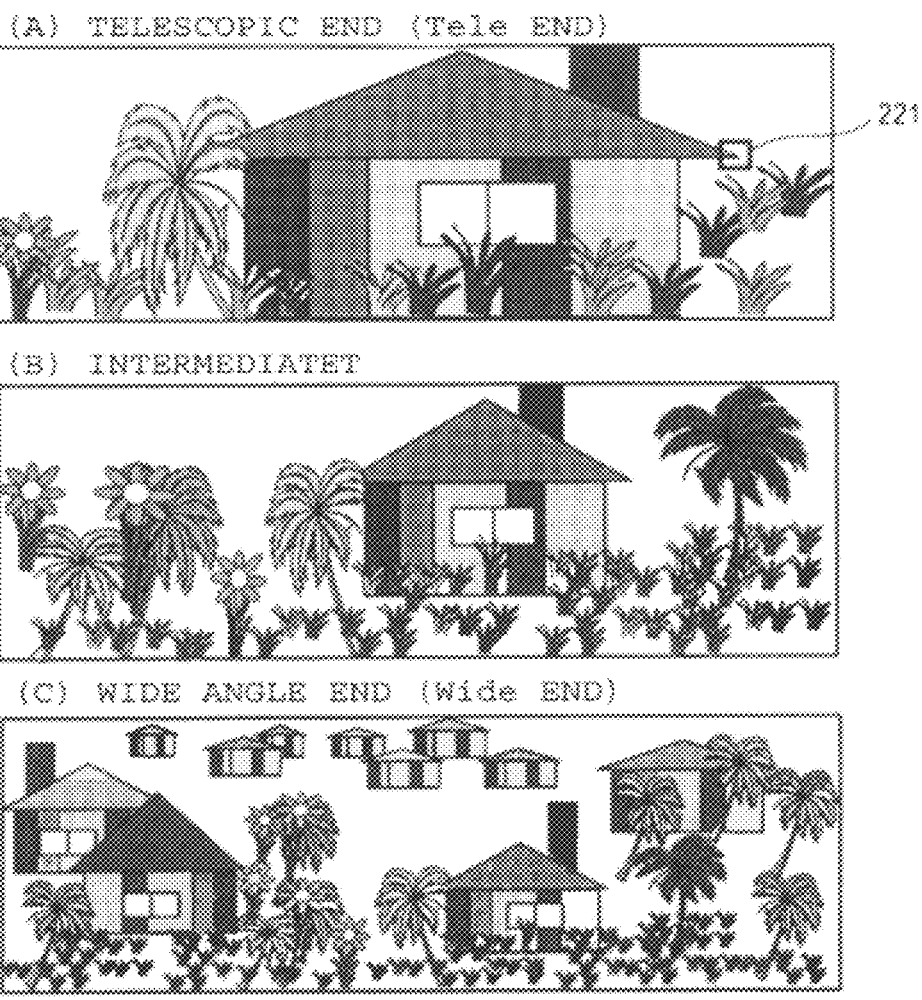
FIG. 3A to FIG. 3C are diagrams illustrating a process of detecting characteristic points from captured images of a telescopic end (tele end) to a wide angle end (wide end).

FIG. 3A to FIG. 3C show three image examples of (1) the image captured at the telescopic end (tele end), (2) the image captured at the intermediate position from the telescopic end to the wide angle end, (3) the image captured at the wide angle end (wide end).

In (1) the image captured at the telescopic end (tele end), the number of objects included in the image is smaller than the case of the image captured at (3) the wide angle end (wide end).

The block matching process is a process of setting a rectangular block formed of a plurality of pixels, comparing two images (L image and R image), for example, for each block from the left upper end to the right lower end on the screen, detecting a composition of the blocks with high correlation, and determining that the group of blocks is the capturing blocks in the same photography subject, that is, the characteristic points (correspondence points).

Considering one image (for example, L image) as the standard image, in the block set as the standard image, a predetermined reference area (search range) is set for the other reference image (R image), and similar blocks are detected in the reference area (search range).

The reference area (search range) is set to include the range expected to retake the same photography area on the basis of lens disposition, requirement at the time of capturing, and the like.

When such characteristic point detection is performed, correlation of pixel distribution in the block, for example, brightness distribution is determined. Accordingly, it is possible to easily detect the characteristic points as much as the image (degree) including many image areas having a particular pattern.

For example, the block having the particular pixel pattern such as the block 221 shown in FIG. 3A is a block which is easily detected as characteristic points.

As understood from three images shown in FIG. 3A to FIG. 3C, a large number of blocks having the particular pixel pattern are included in the image captured at (3) the wide angle end (wide end) than in the image captured at (1) the telescopic end (tele end).

Mostly, this is because the number of photography subject objects included in the image captured at the wide angle end (wide end) is larger than in the image captured at the telescopic end (tele end), and generally, the blocks which can be used as the characteristic points (correspondence points) tend to increase.

From the reason, in the image capturing device of the embodiment, in the calibration process of performing the calculation of the conversion parameters, the initial position is set to the telescopic end (tele end), and the reliability degree based on the characteristic point information is calculated for the telescopic end (tele end). After confirming that the reliability degree at the telescopic end is equal to higher than a preset threshold value, the calibration process is started, then the zoom lens is sequentially move to the wide angle end (wide end), and the conversion parameters are calculated at the plurality of zoom positions.

Next, the process of calculating the reliability information performed by the control unit 132 will be described.

The control unit 132 inputs the characteristic point information 31 generated on the basis of two images (L and R images) by the image analyzing unit 131, and calculates reliability degrees of calculable conversion parameters on the basis of the characteristic points. The characteristic point information 31 includes the number of characteristic points satisfying a predetermined condition and the distribution information.

As described above, in the calculation of the reliability degree, the characteristic point information generated on the basis of two images (L and R images) by the image analyzing unit 131 is used.

The control unit 132 calculates a reliability degree (Vr: Valid ratio) along, for example, the following Formula 1, using the characteristic point information generated on the basis of two images (L and R images) input from the image analyzing unit 131.

$$\text{Reliability Degree}(Vr) = [((\text{Init\_num}) - (a\_\text{num}) - (b\_\text{num}) - (c\_\text{num})) / (\text{Init\_num})] \times 255 \times k \quad (1)$$

However, in the above Formula 1, the parameters represent the following values.

Init_num: the number of performance blocks of block matching (the number of blocks performing the block matching set to the standard image)

a_num: the number of blocks with brightness change included in the performance block of the block matching (the number of blocks in which a pixel value difference between the maximum brightness pixel in the block and the minimum brightness pixel is less than a predetermined threshold value (the number of blocks with uniform brightness))

b_num: the number of blocks in which SAD between the standard block of the standard image selected as the correspondence block in the block matching and the reference block of the reference image is equal to or more than a predetermined threshold value (the number of correspondence blocks with small correlation)

c_num: the number of blocks in which a difference in SAD value between the reference block having the minimum SAD value and the reference block having the second small SAD value of the reference blocks detected in the reference area (search range) is less than the predetermined threshold value (similar blocks in the reference area)

k: coefficient corresponding to distribution of correspondence blocks (characteristic points) (setting of 1 to 0, in which a case of much expansion in the whole screen is 1, and a case of little expansion is 0)

255 as a multiplication is a regularization coefficient multiplied for a regularization process of setting the value of the reliability degree (Vr) in the range of 0 to 255.

The SAD is an indicator value representing correlation between blocks of the standard block set in the standard image and the reference block set in the reference image, and is the sum of absolute difference that is the total sum of differences of brightness of correspondence pixels between blocks.

As the SAD gets smaller, it is the block with higher correlation, that is, the similar block.

As the SAD gets lager, it is the block with lower correlation, that is, the non-similar block.

Figure 4:
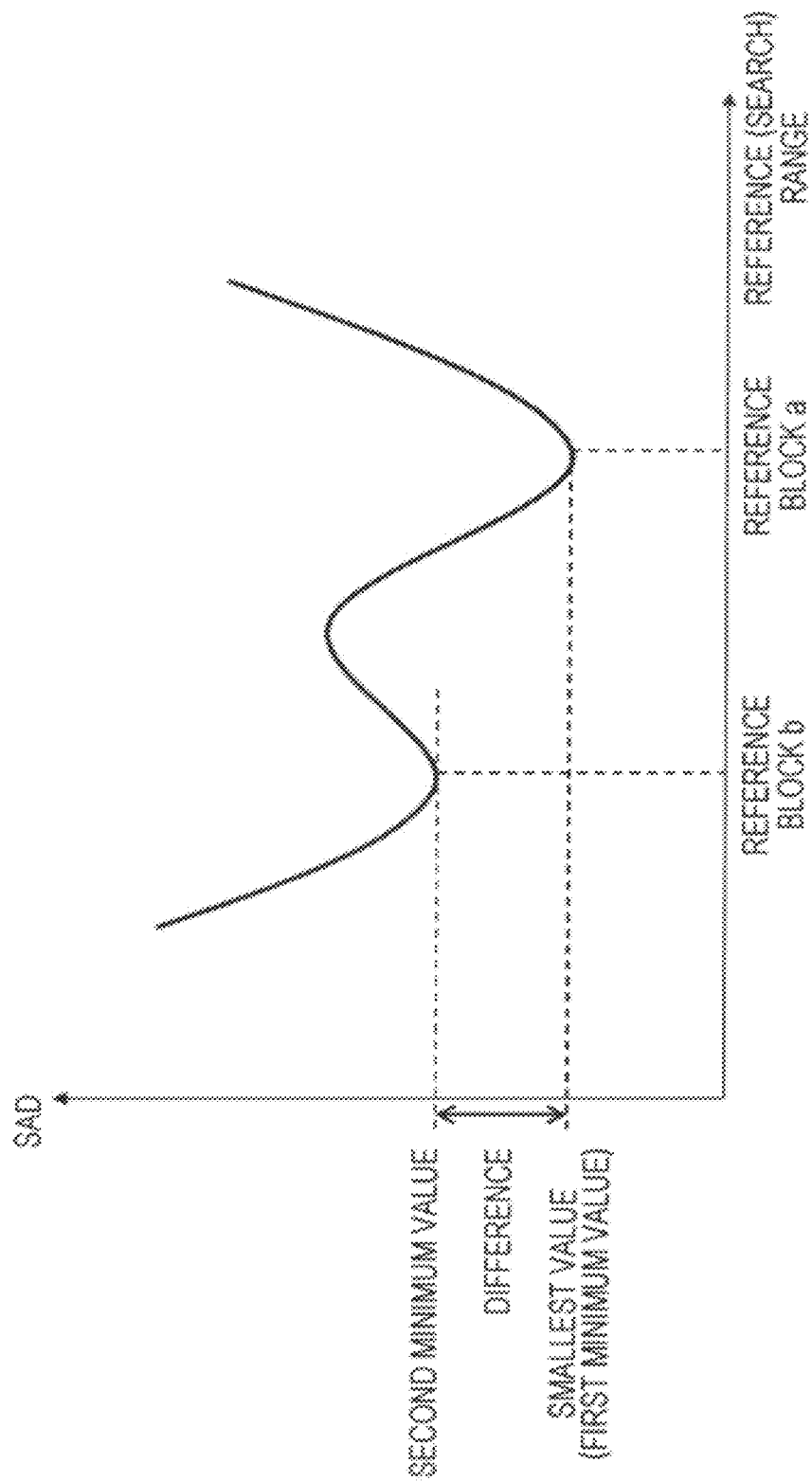
FIG. 4 is a diagram illustrating SAD (Sum of Absolute Difference) as indicator values corresponding to characteristic points.

FIG. 4 is a diagram illustrating an example of a graph representing the value of the SAD of the plurality of reference blocks set in the reference image corresponding to one standard block set in the standard image.

In the block matching, as for one standard block set in the standard image, a process of setting a predetermined range of reference area in the reference image, and detecting a block with high correlation from the plurality of reference blocks included in the reference area is performed.

The block with the high correlation is a block with a small value of SAD.

In the example shown in FIG. 4, the block with the highest correlation is a reference block a. That is, the reference block a is a block having the minimum SAD value.

In the example shown in FIG. 4, there is a block b having the second minimum value in the vicinity of the block a.

[c_num] described in the above Formula 1, that is, c_num: the number of blocks in which a [difference] in SAD value between the reference block having the minimum SAD value and the reference block having the second small SAD value of the reference blocks detected in the reference area (search range) is less than the predetermined threshold value (similar blocks in the reference area).

The [difference] shown in the description corresponds to the difference shown in FIG. 4. That is, Difference=|Minimum Value (First Minimum Value)−Second Minimum Value|.

The control unit 132 calculates the reliability degree (Vr: Valid ratio) according to, for example, the Formula 1, using the characteristic point information (the number and distribution of characteristic points) generated on the basis of two images (L and R images) input from the image analyzing unit 131.

The reliability degree (Vr) means reliability degrees of conversion parameters calculable on the basis of the characteristic points detected from an image.

Generally, the reliability degree of the captured image of the wide angle end (wide end) including the photography subject area of various variations tends to be high, and the reliability degree of the captured image of the telescopic end (tele end) which does not include many photography subject areas tends to be low.

Figure 5:
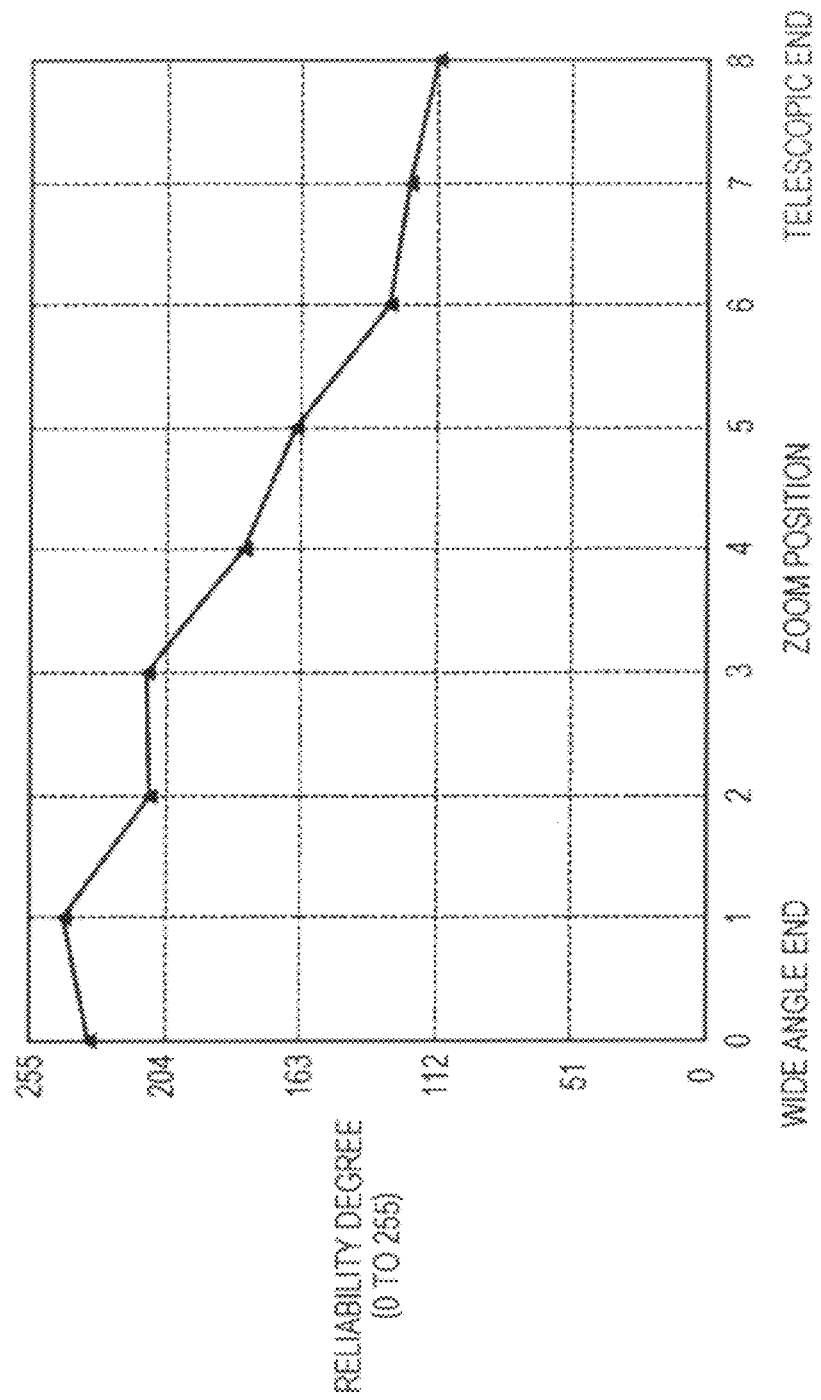
FIG. 5 is a diagram illustrating a correspondence relationship between a zoom position and a reliability degree.

FIG. 5 is a graph illustrating a correspondence relationship between the reliability degrees (Vr) calculated according to the above Formula 1 and the zoon positions at any sample image.

It might not be said that such data are generated for all the images. However, mostly, as shown in FIG. 5, the reliability degree of the image of the wide angle end (wide end) tends to be high and the reliability degree of the image of the telescopic end (tele end) tends to be low.

From such a reason, in the image capturing device according to the embodiment of the present disclosure, first, the reliability degree is calculated for the telescopic end (tele end). When it is confirmed that the reliability degree is equal to or higher than a predetermined threshold value, a previous adjustment process (calibration process) as a process of calculating the conversion parameters is started. Thereafter, the characteristic detection and the parameter calculation are performed while moving the zoom position from the telescopic end (tele end) to the wide angle end (wide end), and thus probability of calculating the conversion parameters with a low reliability degree at the zoom positions is reduced.

The previous adjustment process (calibration process) as the process of calculating the conversion parameters is performed as a process of calculating the conversion parameters for the plurality of zoom positions set in the zoom range from the telescopic end (tele end) to the wide angle end (wide end). In addition, the calculation of the reliability degrees is also performed with the calculation of the conversion parameters. When it success in the calibration process from the telescopic end (tele end) to the wide angle end (wide end), the control unit 132 stores the conversion parameters and the reliability degrees corresponding to the zoom positions in the memory 135.

Figure 6:
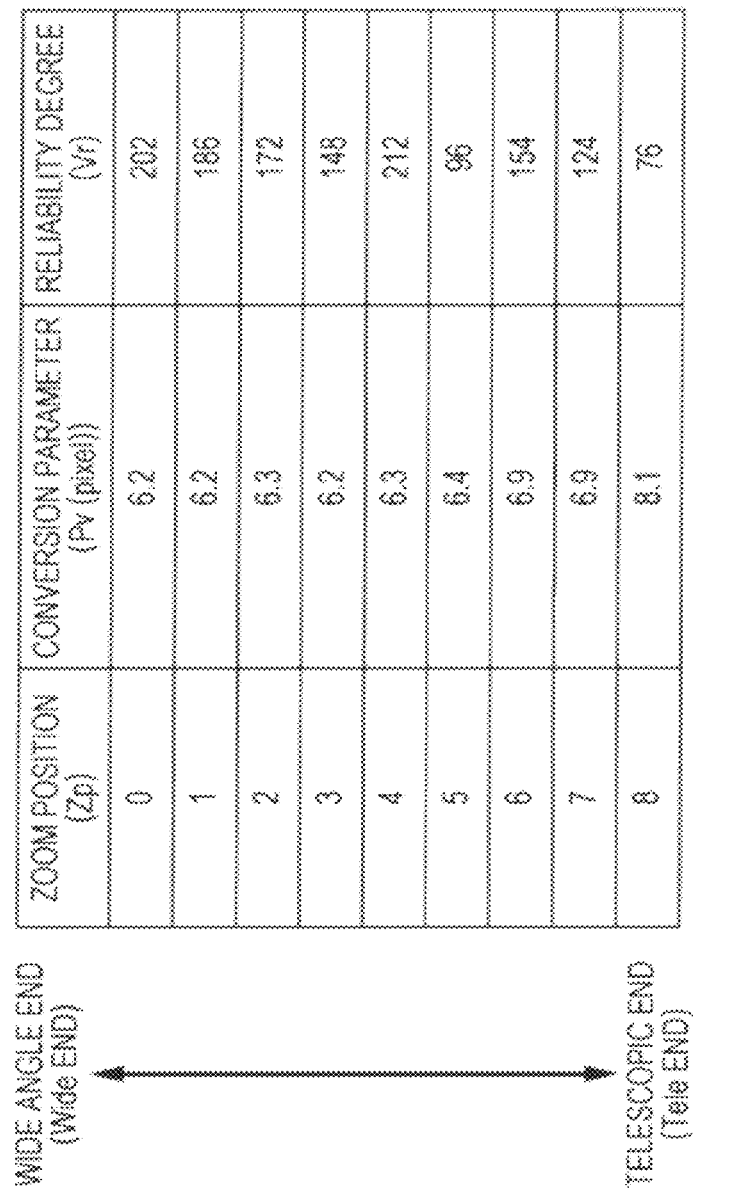
FIG. 6 is a diagram illustrating an example of data of conversion parameters corresponding to zoom positions and reliability degrees stored in a memory.

An example of data stored in the memory 135 is shown in FIG. 6.

As shown in FIG. 6, the control unit 132 stores correspondence data of the zoom positions, the conversion parameters, and the reliability degrees in the memory 135.

The values shown in FIG. 6 are the following data.

Zp: Zoom Position (0: wide angle end, 8: telescopic end)

Pv: Conversion Parameter (conversion parameter for correcting deviation in the up and down direction (in the table, all are positive values, but may be negative values))

Vr: Reliability Degree (indicator value regulated by 255)

In FIG. 6, the conversion parameters represent only the parameters applied to the deviation correction in the up and down direction.

Calculation for the other parameters applied to the affine conversion, for example, parameters about rotation, expansion, reduction, and movement process in the other direction, and a storage process in the memory 13 may be performed. In FIG. 6, only the parameters about the correction of the image deviation in the up and down direction according to the embodiment of the present disclosure are shown.

The conversion parameters and the reliability degrees shown in FIG. 6 are conversion parameters and reliability degrees calculated by the control unit 132 on the basis of the characteristic point information generated on the basis of the image corresponding to each zoom position input from the image analyzing unit 131.

The example shown in FIG. 6 shows an example of calculating the conversion parameters and the reliability degrees at the zoom positions of total 9 points of 0 to 8 in which the wide angle end (wide end) is 0 and the telescopic end (tele end) is 8. As described above, the reliability degree of the wide angle end (tele end) tends to be high, and the reliability degree of the telescopic end (wide end) tends to be low.

At the time of actual image capturing, the values of the conversion parameters stored in the memory are provided to the image conversion units 113 and 123, and the image conversion process is performed. The control unit 132 acquires position information of the zoom lens at the time of the image capturing, acquires the conversion parameters corresponding to the acquired zoom lens positions from the memory 135, and provides the conversion parameters to the image conversion units 113 and 123.

As described above, for example, when there is the conversion parameter corresponding to the zoom position with the value of the low reliability degree equal to or less than a predetermined threshold value, the conversion parameter is not used, the conversion parameters of the zoom positions before and after it, or an interpolation value is calculated on the basis of the conversion parameters of the zoom positions before and after it, and the calculated parameter may be used.

4. Process Sequence in Image Capturing Device

Next, a process sequence performed in the image capturing device will be described with reference to flowcharts shown in FIG. 7 and FIG. 8.

The flows shown in FIG. 7 and FIG. 8 are flows performed by the control of the control unit 132 according to, for example, a program stored in the memory 135.

The flowchart shown in FIG. 7 is an initial setting process of the previous adjustment process (calibration process) performed as the process of calculating the conversion parameters. As described above, in the previous adjustment process (calibration process) performed in the image capturing device, first, the zoom lens is set to the telescopic end (tele end), image analysis based on the captured image at the telescopic end (tele end), that is, characteristic point (correspondence point) detection is performed, and the reliability degrees are calculated on the basis of the detection information. The reliability degrees are reliability degrees of the conversion parameters calculated on the basis of the detected characteristic points.

Only when the reliability degree based on the captured image at the telescopic end (tele end) is equal to or higher than a predetermined threshold value, the calibration as the process of calculating the conversion parameters corresponding to the zoom positions is started. When the reliability degree based on the captured image at the telescopic end (tele end) is not equal to or higher than the predetermined threshold value, the calibration is not started.

The flow shown in FIG. 7 is a flow representing the sequence of the process of determining whether to start or stop the calibration.

When it is determined the reliability degree based on the captured image at the telescopic end (tele end) that is the initial position is equal to or higher than the predetermined threshold value and the calibration start condition is satisfied, the calibration as the process of calculating the conversion parameters corresponding to the zoom positions is performed. FIG. 8 is a flowchart illustrating a detailed sequence of the process.

Hereinafter, the processes will be sequentially described.

4.1. Process of Determining Calibration Start Condition

First, the detailed sequence of the process of determining the calibration start condition will be described with reference to FIG. 7.

First, in the step S101, the zoom lens is moved to the telescopic end (tele end). The control unit 132 shown in FIG. 1 outputs the zoom position indicating values 13 and 23 to both of the first lens 111 and the second lens 121, and moves the zoom lens to the telescopic end (tele end).

Then, the image conversion parameter is initialized. This is the setting of the image conversion parameter used as the initial value, a predetermined default value may be used, or the latest updated data or the like may be acquired from the memory 135 and may be used. The control unit 132 provides the initial value of the conversion parameter to the first image conversion unit 113 and the second image conversion unit 123.

Then, in the step S103, in the state of moving to the telescopic end (tele end), an image is captured for both of the first lens 111 and the second lens 121. The conversion process is performed on the captured image by applying the initially set conversion parameter to the first image conversion unit 113 and the second image conversion unit 123, and the captured image is input to the image analyzing unit 131. In the image analyzing unit 131, the block matching process based on the input image is started.

The step S104 and the step S105 are processes of generating characteristic point information performed by the image analyzing unit 131 on the basis of the block matching process in the image analyzing unit 131.

The step S104 is a process of acquiring the number of characteristic points satisfying a predetermined condition.

The step S105 is a process of acquiring distribution information of characteristic points.

The process of acquiring the characteristic points performed in the step S104 is a process of calculating Formula 1 in advance, and acquiring the number of characteristic points satisfying various conditions. That is, the process of acquiring the following number of characteristic points (number of blocks) is performed.

Init_num: the number of performance blocks of block matching (the number of blocks performing the block matching set to the standard image)

a_num: the number of blocks with brightness change included in the performance block of the block matching (the number of blocks in which a pixel value difference between the maximum brightness pixel in the block and the minimum brightness pixel is less than a predetermined threshold value (the number of blocks with uniform brightness))

b_num: the number of blocks in which SAD between the standard block of the standard image selected as the correspondence block in the block matching and the reference block of the reference image is equal to or more than a predetermined threshold value (the number of correspondence blocks with small correlation)

c_num: the number of blocks in which a difference in SAD between the reference block having the minimum SAD value and the reference block having the second small SAD value of the reference blocks detected in the reference area (search range) is less than the predetermined threshold value (similar blocks in the reference area)

In step S104, the number of characteristic points (number of blocks) corresponding to the conditions of (Init_num), (a_num), (b_num), and (c_num) is acquired.

In the process of acquiring the distribution information of the characteristic points performed in the step S105, a process of acquiring the coefficient k of Formula 1 described above, that is, the value of the following k is performed.

k: coefficient corresponding to distribution of correspondence blocks (characteristic points) (setting of 1 to 0, in which a case of much expansion in the whole screen is 1, and a case of little expansion is 0)

The image analyzing unit 131 determines expansion of characteristic points on the screen along a predetermined algorithm, and calculates the characteristic point distribution information k.

The process of reliability degree calculation and display of the step S106 is a process performed in the control unit 132 inputting the characteristic point information formed of the above-described number of characteristic points and the characteristic point distribution information generated by the image analyzing unit 131.

The control unit 132 inputs the characteristic point information formed of the number of characteristic points and the characteristic point distribution information described above from the image analyzing unit 131, calculates the reliability degree along the above-described Formula 1, and displays the calculated reliability degree as the indicator on the display unit 133.

That is, the reliability degree is calculated along the following Formula 1.

$$\text{Reliability Degree}(Vr) = [((\text{Init\_num}) - (a\_\text{num}) - (b\_\text{num}) - (c\_\text{num}))/(\text{Init\_num})] \times 255 \times k \quad (1)$$

The reliability degree calculated herein is a reliability degree calculated on the basis of the image captured in a state where both zoom lenses of the first lens 111 and the second lens 121 are moved to the telescopic end (tele end).

The calculated reliability degree is displayed on the display unit 133.

A display image corresponding to the screen of the step S11 shown in FIG. 2 is displayed.

As described as the process of the step S11 shown in FIG. 2, an indicator representing the reliability degree is displayed on the display unit 133 by overlapping with the captured image at the telescopic end (tele end). On the indicator, the predetermined threshold value and the calculated reliability degree are displayed, and the user can confirm whether or not the reliability degree is equal to or higher than the threshold value.

In the step S107, the control unit 132 determines whether or not the reliability degree calculated on the basis of the captured image at the telescopic end (tele end) is equal to or higher than the predetermined threshold value. When the reliability degree is equal to or higher than the threshold value (determination of the step S107: Yes), the process transfers to the automatic adjustment start state, that is, the calibration process of performing the process of calculating the conversion parameters while moving the zoom lens.

Meanwhile, in the step S107, when the reliability degree calculated on the basis of the captured image at the telescopic end (tele end) is lower than the predetermined threshold value (determination of the step S107: No), a message of request to change an angle of a camera is displayed on the display screen of the display unit 133 (display screen of the step S11 shown in FIG. 2). That is, when the control unit 132 determines that the reliability degree calculated at the initial position where the zoom lens is set to the telescopic end is lower than the predetermined threshold value, the control unit 132 outputs, for example, a message of request to change the captured image to the display unit 133. After this process, the image analyzing process based on the other photography subject, that is, the block matching process of the step S103 is performed again.

4.2. Process of Calculating Conversion Parameter Corresponding to Zoom Position

Next, a sequence of the calibration process as the process of calculating the conversion parameters corresponding to the zoom positions will be described with reference to a flowchart shown in FIG. 8.

The flow shown in FIG. 8 is a flow representing a detailed sequence of the calibration process performed when it is determined that the reliability degree calculated on the basis of the captured image at the telescopic end (tele end) is equal to higher than the threshold value (determination of the step S107: Yes) in the step S107 of the flow shown in FIG. 7.

In the calibration process, the zoom lens is sequentially moved from the telescopic end (tele end) to the wide angle end (wide end), and the conversion parameters corresponding to the plurality of predetermined zoom lens positions are calculated.

First, in the step S201, the conversion parameters for correcting up and down deviation between images are calculated on the basis of the characteristic point information set to the telescopic end (tele end) that is the calibration start position. The conversion parameters include not only the deviation in the up and down direction of the images but also the other parameters such as rotation, expansion, and reduction. However, herein, a process of calculating the parameters for correcting the deviation in the up and down direction of two images (L image and R image) will be described.

As described above, the calibration is started when it is possible to calculate the conversion parameters with the high reliability by the analysis of the characteristic points of the image captured at the telescopic end (tele end). First, the control unit 132 calculates the conversion parameters on the basis of the characteristic point information detected from the image captured at the telescopic end (tele end) that is the initial set position. The calculated parameters are stored in, for example, a temporary storage area of the memory 135.

At this time point, rewriting (update) of the conversion parameters at the time of performing the previous calibration stored in the memory 135 is not performed. After it is determined that it succeeds in the calculation of the conversion parameters from the telescopic end (tele end) to the wide angle end (wide end), the rewriting (update) is performed in the step S218.

Then, in the step S202, the zoom lens is moved. Movement of a preset distance is performed from the telescopic end (tele end) to the wide angle end (wide end). For example, similarly to the memory input data described with reference to FIG. 6, to perform the process of calculating the conversion parameters for a plurality of points from the telescopic end (tele end) to the wide angle end (wide end), the zoom lens is moved to the next calculation point.

Then, in the step S211, two images (L image and R image) acquired through the first lens 111 and the second lens 121 at the newly set zoom lens position are input to the image analyzing unit 131 to perform the image analysis. Specifically, the block matching process of two images (L image and R image) is performed.

First, in the step s201, two images (L image and R image) acquired through the first lens 111 and the second lens 121 are input to the image analyzing unit 131 to perform the image analysis. Specifically, the block matching process of two images (L image and R image) is performed.

Herein, the image input to the image analyzing unit 131 is an image converted by applying the latest conversion parameters in the first image conversion unit 113 and the second image conversion unit 123. For example, in time of the image analyzing process at the next zoom lens set position of the initially set telescopic end (tele end), the conversion parameters calculated on the basis of the image at the telescopic end (tele end) is applied, the image conversion is performed in the first image conversion unit 113 and the second image conversion unit 123, and the image analyzing unit 131 performs the block matching based on the converted image.

In the step S212, the image analyzing unit 131 acquires the number of characteristic points satisfying the predetermined condition, on the basis of the block matching process. The process is the same process of the step S104 described above in the flow shown in FIG. 7, and is performed as a process of acquiring the following number of characteristic points (number of blocks) included in the above-described Formula 1.

(Init_num)
(a_num),
(b_num),
(c_num)

Then, in the step S213, the image analyzing unit 131 acquires the distribution information of the characteristic points detected on the basis of the block matching process. The process is the same process of the step S105 described above in the flow shown in FIG. 7, and the coefficient k of the above-described Formula 1, that is, the following value of k is calculated.

k: coefficient corresponding to distribution of correspondence blocks (characteristic points) (setting of 1 to 0, in which a case of much expansion in the whole screen is 1, and a case of little expansion is 0)

The image analyzing unit 131 determines expansion of characteristic points on the screen along a predetermined algorithm, and calculates the characteristic point distribution information k.

The process of reliability degree calculation and display of the step S214 is a process performed in the control unit 132 inputting the characteristic point information formed of the above-described number of characteristic points and the characteristic point distribution information generated by the image analyzing unit 131.

The control unit 132 inputs the characteristic point information formed of the number of characteristic points (number of blocks) and the characteristic point distribution information described above from the image analyzing unit 131, calculates the reliability degree along the above-described Formula 1, and displays the calculated reliability degree as the indicator on the display unit 133.

That is, the reliability degree is calculated along the following Formula 1.

$$\text{Reliability Degree}(Vr) = [((\text{Init\_num}) - (a\_num) - (b\_num) - (c\_num))/(\text{Init\_num})] \times 255 \times k \quad (1)$$

The reliability degree calculated herein is a reliability degree calculated on the basis of the image captured in a state where both zoom lenses of the first lens 111 and the second lens 121 are moved to a predetermined zoom position.

The calculated reliability degree is displayed on the display unit 133.

A display image corresponding to the screen of the step S21 shown in FIG. 2 is displayed.

As described as the process of the step S21 shown in FIG. 2, an indicator representing the reliability degree is displayed on the display unit 133 by overlapping with the captured image at the set zoom lens position. On the indicator, the predetermined threshold value and the calculated reliability degree are displayed, and the user can confirm whether or not the reliability degree is equal to or higher than the threshold value.

Then, in the step S215, the control unit 132 calculates the conversion parameters on the basis of the captured image at the set zoom position.

Then, in the step S216, the control unit 132 determines whether or not the current zoom lens position is the wide angle end (wide end).

When the current zoom position is the wide angle end (wide end), it is determined that the calculation of the conversion parameters at all the zoom lens positions is completed, and the process proceeds to the step S217.

When the current zoom position is not the wide angle end (wide end), it is determined that the calculation of the conversion parameters at all the zoom lens positions is not completed, the process returns to the step S202, the zoom lens is moved to the wide angle end (wide end) side, the step S211 and the subsequence are repeated.

In the step S216, when it is determined that the current zoom position is the wide angle end (wide end) and the process proceeds to the step S217, determination of success of the automatic adjustment process is performed. The determination process is performed on the basis of the reliability degrees calculated with the calculated conversion parameters.

For example, when there are n points of the conversion parameter calculation positions set from the telescopic end (tele end) to the wide angle end (wide end), it is determined as "success" when it is possible to obtain the reliability degree equal to or higher than a predetermined threshold value by the number equal to more than the number of preset points (for example, equal to or more than 70%) among such n points.

When points for which it is possible to obtain the reliability degree equal to or higher than the threshold value is less than the preset number of points, among the n points for which the conversion parameters are calculated, it is determined as "failure". In this case, the determination of the step S217 is "No", a message representing failure of the process is output (see (S23) of FIG. 2), and the automatic adjustment process, that is, the calibration process is performed again. In this case, the process returns to the step S101 shown in FIG. 7, the zoom lens returns to the telescopic end (tele end), and the process is performed again.

The process corresponds to transfer of the processes from the step (S23) shown in FIG. 2 to the step (S11).

Meanwhile, in the step S217, when it is determined as "success" since it is possible to obtain the reliability degrees equal to high than the predetermined threshold value by the number equal to or more than the preset number of points among the n points set from the telescopic end (tele end) to the wide angle end (wide end), the process proceeds to the step S218.

In step S218, a process of recording the conversion parameters calculated at the zoom lens set positions from the telescopic end (tele end) to the wide angle end (wide end) acquired in the calibration process, as the latest conversion parameters in the memory 135. When there is previous recording information, rewriting is performed on the information to perform data update.

The data stored in the memory in the recording process is the data described with reference to FIG. 6.

The conversion parameters and the reliability degrees are recorded together as the data corresponding to the zoom positions.

The calibration process is completed by such a process.

As a result, the conversion parameters corresponding to the zoom positions stored in the memory 135 are used in time of the conversion process of the captured image of the user.

Recording and outputting of the 3D image formed of the L and R images with high quality in which the deviation in the up and down direction is corrected is realized.

The present disclosure has been described in detail with reference to the specific embodiment. However, it is obvious that a person skilled in the art may modify and replace the embodiment within the scope which does not deviate from the concept of the present disclosure. That is, the present disclosure has been described as an example, and thus should not be definitively analyzed. To determine the concept of the present disclosure, it is preferable to consider Claims.

A series of processes described in the specification may be performed by hardware, software, or complex configuration of both. When the process is performed by software, a program recording the process sequence may be installed in a memory of a computer configured by dedicated hardware and may be executed, or a program may be installed in a wide-use computer capable of performing various processes and may be executed. For example, the program may be recorded in a recording medium in advance. In addition to the installation from the recording medium to the computer, the program may be received through a network such as LAN (Local Area Network) and Internet, and may be installed in a recording medium such as a built-in hard disk.

Various processes described in the specification are performed in time series according to the description, and may be parallel or individually performed according to process capability of a device performing the processes or as necessary. The system in the specification is a logical group configuration of a plurality of devices, and is not limited to that the devices with configurations are provided in the same case.

The present disclosure contains subject matter related to that disclosed in Japanese Priority Patent Application JP 2011-026242 filed in the Japan Patent Office on Feb. 9, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for determining image conversion parameters for correcting deviation between a plurality of images captured by a plurality of image capturing units comprising:
   a computer, a memory, and a program installed on the memory executed by the computer to:
   calculate an image conversion parameter to correct deviation in up and down direction of the plurality of images according to image analysis to the plurality of images captured by the plurality of the image capturing units at an initial position of a zoom lens of the image capturing unit;
   calculate a reliability degree of the image conversion parameter according to image analysis to the plurality of images captured by the plurality of the image capturing units at the initial position of the zoom lens of the image capturing unit, the reliability degree being calculated based on at least one of a number of correspondence points between the plurality of images, and a distribution of the correspondence points;
   for a first set of images of the plurality of images captured, where the reliability degree calculated for the first set of images at the initial position is equal to or more than a predetermined threshold value, sequentially move the zoom lens from a telescopic side to a wide angle side, and calculate the image conversion parameter for each zoom position of the zoom lens, the zoom position being at wider angle side than the initial position, according to the image analysis to the plurality of images captured by the plurality of the image capturing units; and for a second set of images of the plurality of images captured, where the reliability degree calculated for the second set of images at the initial position is less than the predetermined threshold value, output to a user an alert of request to change an angle of each of the plurality of image capturing units without calculating the image conversion parameter for each zoom position of the zoom lens.

2. The apparatus according to claim 1, wherein the initial position is a telescopic end.

3. The apparatus according to claim 1, wherein the circuitry indicates the reliability degree to the user.

4. The apparatus according to claim 1, wherein the alert is a message of request to change the captured image.

5. The apparatus according to claim 1, wherein the plurality of images are a left eye image and a right eye image.

6. The apparatus according to claim 1, wherein the circuitry associates each zoom position, the image conversion parameter and the reliability.

7. A method for determining image conversion parameters for correcting deviation between a plurality of images captured by a plurality of image capturing units, the method comprising the steps of:

calculating, using a computer, an image conversion parameter to correct deviation in up and down direction of the plurality of images according to image analysis to the plurality of images captured by the plurality of the image capturing units at an initial position of a zoom lens of the image capturing unit;

calculating, using the computer, a reliability degree of the image conversion parameter according to image analysis to the plurality of images captured by the plurality of the image capturing units at the initial position of the zoom lens of the image capturing unit, the reliability degree being calculated based on at least one of a number of correspondence points between the plurality of images, and a distribution of the correspondence points;

for a first set of images of the plurality of images captured, where the reliability degree calculated for the first set of images at the initial position is equal to or more than a predetermined threshold value, sequentially moving the zoom lens from a telescopic side to a wide angle side, and calculating, using the computer, the image conversion parameter for each zoom position of the zoom lens, the zoom position being at wider angle side than the initial position, according to the image analysis to the plurality of images captured by the plurality of the image capturing units; and for a second set of images of the plurality of images captured, where the reliability degree calculated for the second set of images at the initial position is less than the predetermined threshold value, outputting to a user an alert of request to change an angle of each of the plurality of image capturing units without calculating the image conversion parameter for each zoom position of the zoom lens.

8. The method according to claim 7, wherein the initial position is a telescopic end.

9. The method according to claim 7, further comprising the step of indicating the reliability degree to the user.

10. The method according to claim 7, wherein the alert is a message of request to change the captured image.

11. The method according to claim 7, wherein the plurality of images are a left eye image and a right eye image.

12. The method according to claim 7, further comprising the step of associating each zoom position, the image conversion parameter and the reliability.

13. A non-transitory computer readable medium including executable instructions, which when executed by a computer cause the computer to execute a method for determining image conversion parameters for correcting deviation between a plurality of images captured by a plurality of image capturing units, the method comprising the steps of:

calculating an image conversion parameter to correct deviation in up and down direction of the plurality of images according to image analysis to the plurality of images captured by the plurality of the image capturing units at an initial position of a zoom lens of the image capturing unit;

calculating a reliability degree of the image conversion parameter according to image analysis to the plurality of images captured by the plurality of the image capturing units at the initial position of the zoom lens of the image capturing unit, the reliability degree being calculated based on at least one of a number of correspondence points between the plurality of images, and a distribution of the correspondence points;

for a first set of images of the plurality of images captured, where the reliability degree calculated for the first set of images at the initial position is equal to or more than a predetermined threshold value, sequentially moving the zoom lens from a telescopic side to a wide angle side, and calculating the image conversion parameter for each zoom position of the zoom lens, the zoom position being at wider angle side than the initial position, according to the image analysis to the plurality of images captured by the plurality of the image capturing units; and for a second set of images of the plurality of images captured, where the reliability degree calculated for the second set of images at the initial position is less than the predetermined threshold value, outputting to a user an alert of request to change an angle of each of the plurality of image capturing units without calculating the image conversion parameter for each zoom position of the zoom lens.

14. The apparatus according to claim 1, wherein the reliability degree calculated in a case that the zoom lens of the image capturing unit is at the wider angle side than the initial position has a tendency to be greater than the reliability degree calculated in the case that the zoom lens of the image capturing unit is at the initial position.

15. The apparatus according to claim 1, wherein only in the case that the reliability degree calculated at the initial position is equal to or more than the predetermined threshold value, the circuitry calculates the image conversion parameter and the reliability degree for each zoom position of the zoom lens, the zoom position being at wider angle side than the initial position, such that a probability that the image conversion parameter calculated at the wider angle side than the initial position is with a lower reliability degree than the reliability degree at the initial position is reduced.

16. The apparatus according to claim 1, wherein the circuitry determines whether to update the image conversion parameter in a case that the circuitry determines a current position of the zoom lens is a wide angle end.

17. The apparatus according to claim 1, wherein the circuitry determines to update the image conversion parameter in a case that a number of the reliability degrees which exceed a certain threshold value is equal to or more than a predetermined number.

18. The apparatus according to claim 1, wherein the circuitry does not use the image conversion parameter calculated at a position of the image capturing unit where the reliability degree is less than the predetermined threshold value to correct the deviation.

19. The apparatus according to claim 1, wherein
only in the case that the reliability degree calculated at the initial position is equal to or more than the predetermined threshold value, sequentially move the zoom lens from a telescopic side to a wide angle side, and calculate the image conversion parameter and the reliability degree for each zoom position of the zoom lens, the zoom position being at wider angle side than the initial position, according to the image analysis to the plurality of images captured by the plurality of the image capturing units; and
determine whether to update the image conversion parameter based on the reliability degree for each zoom position of the zoom lens.

20. The apparatus according to claim 1, wherein the apparatus further comprises a display, and the alert is displayed on the display.

* * * * *